Oct. 17, 1961
W. F. MORRIS, JR
3,004,395
METHOD OF HANDLING REFRIGERANT
Filed July 25, 1956
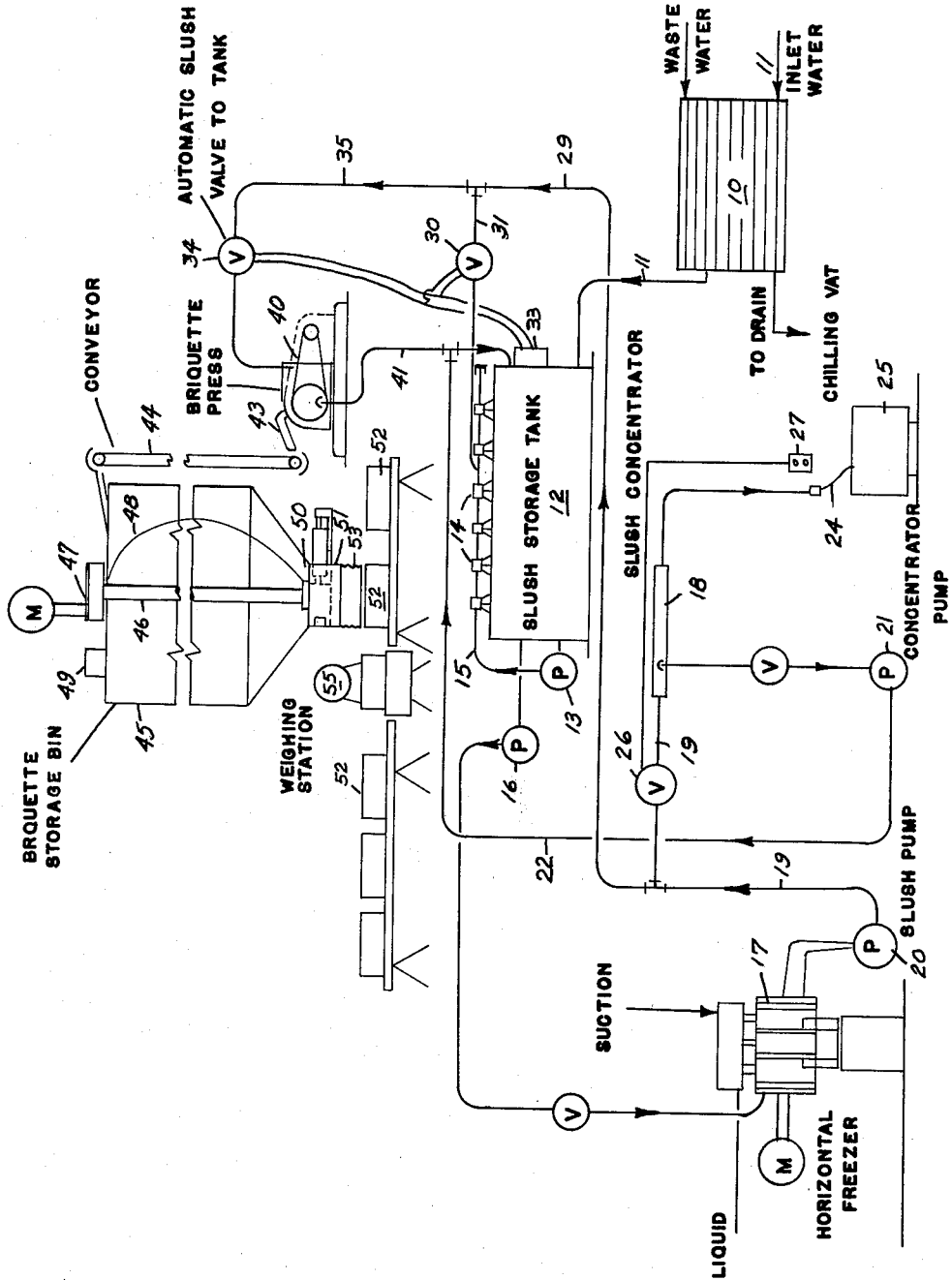
WILLIAM F. MORRIS JR. INVENTOR.
BY
*David Rabin*
ATTORNEY 3,004,395
METHOD OF HANDLING REFRIGERANT
William F. Morris, Jr., Raleigh, N.C., assignor to Morris and Gorrell, Inc., Raleigh, N.C., a corporation of North Carolina
Filed July 25, 1956, Ser. No. 599,986
3 Claims. (Cl. 62—66)

The present invention relates to a system, apparatus, and method for handling water in various forms as a refrigerating media when employed in the application of refrigerating articles of food, such as poultry, which medium initially may be utilized for rapidly and economically reducing the internal temperature of a large number of birds prior to evisceration and also utilize the same apparatus for supplying adequate refrigerant on demand in solid form to package together with poultry prior to storage and shipment of the poultry to market.

Mass production methods for processing poultry and other similar products have been retarded primarily due to the chilling period required for the removal of internal body heat immediately after the poultry has been killed and plucked. Furthermore, after killing, the birds must be stored prior to evisceration at a relatively low temperature, that is between 32 to 41 degrees F. until the birds are ready to be eviscerated. Accelerated temperature reduction is extremely vital since internal intestinal decomposition and a loss of flavor and tenderness will occur very rapidly unless the temperature of the bird is reduced to the required temperature within four hours after killing.

In order to have assembly line production in the processing of poultry it is necessary to accumulate a sufficient number of birds for the eviscerating line. Ordinarily a large supply of birds will consume a large surface area in a plant, particularly when the birds are stored in large chilling vats during the chilling time period. Obviously, the advantages of supplying a more costly and rapid refrigerating medium must be weighed against the factors of space, increased quality, and the cost of mass producing dressed poultry.

From the standpoint of health and sanitary standards water ice is probably the only acceptable refrigerating medium for this chilling process. Conventional installations utilize large vats into which city water or precooled water is mixed with either cracked, chipped or block ice in order to reduce the temperature of the bath sufficiently to chill approximately five hundred to seven hundred pounds of poultry placed in the individual chilling vats. With this limited capacity for storing the poultry during the chilling process a large storage area is required when assembly line evisceration is to be employed.

It has also been characteristic for poultry dressing concerns to be located within the immediate proximity of an ice producing plant as the demand for ice as the basic refrigerant is large. It has been estimated that approximately two pounds of ice are needed for each one pound of chicken that is processed and packaged ready for shipment. Again large ice storage facilities are needed to accommodate the large quantity of ice which must be made available.

Once the birds have been eviscerated they are weighed and then packaged, crated and iced with a predetermined number of pounds of ice provided for so many pounds of chicken. This crating of poultry was normally accomplished by manually shoveling cracked, chipped or block ice into a crate loaded with poultry in a haphazard manner. Frequently when the poultry reached the market, inspection indicated that some spoilage had occurred due to improper refrigerant distribution and some odor was present indicating the start of decomposition.

The present inventive concept contemplates the combination of apparatus for the continuous production of various forms of water-ice, and methods of handling this refrigerating medium. There is also contemplated the application of various means of maintaining the flow of a water-ice mixture, referred to also as slush ice, in a closed conduit and a means for automatically dispensing predetermined quantities of solid ice for packing purposes. Broadly, the invention comprises apparatus in which water is continuously supplied to heat transfer equipment for precooling and supplying the precooled water to an ice producing machine in which the precooled water is subjected to a refrigerated chamber against which the water congeals to form a layer of ice and the ice is continuously removed from the chamber preferably in fine discreet crystals and the ice crystals are mixed with additional precooled water to form a slush ice mixture. The slush ice mixture is of a constituency which may be pumped through a closed conduit for discharge at a remote location into an open vat or other processing equipment. Intermittent or sequential discharge on demand through the closed conduit is facilitated by means of an automatic defrosting valve in the conduit. Slush ice production in excess of demand for immediate requirements may be diverted for storage to a water precooling storage chamber wherein the maximum slush ice accumulation is controlled so that excess slush ice supply may be diverted automatically to an ice compressing apparatus wherein individual ice blocks or briquets are formed continuously from the slush ice mixture for discharge ultimately into a briquet storage bin. Block or briquet ice may be removed periodically from the storage bin for packing purposes. An automatic weighing and loading apparatus discharges a predetermined quantity of solid ice received from a solid ice storage bin into a poultry packed crate. Storage capacity control means in the solid ice storage bin will function to discontinue the production of slush ice as the storage bin becomes loaded to capacity. Upon demand for slush ice at the chilling vats or the slush ice storage chamber or the solid ice storage bin, the ice producing equipment will be activated to respond immediately to supply this demand at the designated location.

Although the apparatus and method of handling the water-ice in various states may be applicable to many refrigerating uses, for the purpose of this specification and without any limitations intended, the present apparatus will be described for poultry processing.

Normally 3 to 4½ hours are required to reduce the temperature or to chill a vat having poultry weighing 750 pounds to 38 to 40 degrees F. by utilizing conventional block or chip ice and water mixtures in a chilling vat. The heat transfer process involved in chilling is retarded appreciably as the melting ice must first cool the water surrounding the mass of poultry within the vat and then gradually the cool water will chill the chickens within the vat. By this indirect method of cooling water, even with agitation or circulation present, the water surrounding the mass of poultry tends to form an excellent insulating blanket which will envelop the birds and the chilling time is appreciably retarded. By utilizing a snowlike conglomerate of tiny ice crystals which tend to cling to the entire chicken both inside and outside, producing a direct chilling effect from the slush mixture, the internal temperature of the poultry may be reduced to the desired temperature within 45 to 90 minutes, as will be presented more fully hereinafter, thereby completely eliminating the possibility of internal decomposition.

When the poultry is removed from the chilling vats they are weighed in a production line system after which they are crated. The general practice has been to crush large blocks of water ice and dump or shovel an unweighed volume of ice into a poultry packed crate, then to close the crate under pressure and store the packaged crate until shipment. Frequently large pieces of ice introduced into a crate together with poultry will prevent uniform ice distribution in the crate. Furthermore, due to the haphazard manner of judging the quantity of ice loaded into each crate, there frequently results some poultry spoilage prior to the crate reaching the ultimate destination. To effectively overcome these and other disadvantages of packing in this manner a predetermined volume of small solid water-ice may be extracted from the hopper of an automatic ice feeding station for dispensing the ice into a poultry packed crate which is presented to an ice feeding station.

Therefore, it is an object of this invention to provide a novel method for supplying water-ice in various stages for processing purposes by pumping a slush ice mixture from the position of ice formation to a remote location.

Another object of the present invention is the formation of a fluid refrigerating mixture of water-ice having discreet ice crystals in the mixture which mixture may be pumped in closed conduits.

Yet another object of this invention is the provision of a continuous method of producing and handling a water-ice refrigerant initially in a liquid-solid state suitable for pumping in a closed conduit to a remote processing location and also pumping the refrigerant in a liquid-solid state to an apparatus for forming individual solid ice blocks continuously.

Still a further objective of this invention is to provide a closed refrigeration system in which water may be utilized in various states as the refrigerating medium whereby a water-ice or slush mixture may be pumped after formation to remote processing stations or to an ice pressing station to form solid ice blocks for ultimate packing.

A further objective of this invention is the provision of an automatically and continuously functioning refrigeration plant in which a water-ice refrigerant may be pumped to a processing location, or to a water precooling storage chamber, or to an apparatus for compressing the water from the ice to formulate a solid ice block for packing purposes, or to a bin or table for accumulating the snow ice only and returning the water to the freezing circuit again.

A further object of this invention is the provision of a slush storage heat exchanger in which water may be precooled by direct contact with stored slush ice.

Yet another object of this invention is the provision of a slush ice container and storage bin for supplying additional slush ice required for processing.

Other and further objects and many of the attendant advantages of this invention will become readily apparent from the following detailed description of one complete system in which various elements of apparatus are utilized and in which similar structures have the same reference characters and wherein:

The FIGURE is a schematic flow diagram illustrating a continuous flow system for producing and handling a water-ice mixture and solid ice of the present inventive concept.

Referring to the FIGURE there is illustrated a schematic flow diagram of a refrigerating system for the continuous production of slush ice or solid ice for distribution to various remote locations. Various pieces of conventional or standard apparatus are employed in this system and although specifically designated equipment may be disclosed equivalent apparatus may be substituted to obtain the same or comparable results when modified insubstantially. Therefore, reference to specific apparatus is not intended in any limitative sense to preclude the use of equivalent or comparable equipment.

In most installations it will be most economical to supply the incoming fresh water, usually at 70 degrees F., directly to a double pipe, counterflow, horizontal pipe heat exchanger 10 with the waste cold water from drains, chilling vats, and other discharges being pumped through the heat exchanger before dumping to a drain line to reduce the temperature of the inlet water to 50 to 55 degrees F. The supply or incoming make-up water in line 11 is fed into the slush storage tank 12 to be mixed and circulated with the water in the system. The water within the slush storage tank 12 is recirculated continuously by the recirculating pump 13 to further remove sensible heat in the water by pumping this water through the spray heads 14 which are spaced along the spray header line 15. The water discharged from the spray or sprinkler heads will pass over slush ice storaged within the slush ice tank 12. Recirculation of this water is desirable until the water temperature is 32 degrees F. Precooled water will be drawn off continuously from the storage tank reservoir by the pump 16 and pumped to a freezer unit or ice-making machine 17.

Normally the slush storage tank 12 will accumulate a sufficient supply of slush ice after a previous day's operation to refrigerate adequate water supply for the next day's operation. However, depending on the capacity of the storage tank 12 and the plant operating demands, the various equipment may be designed to function over prolonged periods.

Precooled water, preferably at 32 degrees F., will be pumped into the ice-making machine 17 wherein it will contact a refrigerated annular surface on which surface a thin film or layer of ice will congeal. Ice film congealed on the refrigerated surface in the ice-making machine will be removed continuously by a film remover which revolves about the axis of the annular surface. The film removed from the refrigerated surface breaks down into fine discreet crystals or particles and these crystals are mixed with additional precooled water which is flushed through the machine 17.

One form of commercial slush ice making machine is similar to the one disclosed in U.S. Patent No. 1,930,570, issued to W. H. Taylor, and sold commercially as the "Vilter Pak-Ice" machine. Other U.S. Patents issued to W. H. Taylor disclose additional machines for producing this slush ice, however, there are numerous other small ice producing machines in the art and commercially available for producing this slush mixture. Heretofore, the slush ice produced by this equipment had been discharged from the slush ice machine onto an open conveyor or an open chute and either by gravity flow or special conveyor blades, the agglomerated mass was urged to flow to a not too remote location. Usually an ice-forming press received this slush ice mixture and excess water was extracted from the slush ice to form solid ice blocks or briquettes as more fully disclosed in U.S. Patent No. 1,937,170, among others, issued to W. H. Taylor.

The slush ice mixture discharged from the freezer machine 17 will have a constituency of approximately 25% ice crystals and 75% water, however, in some applications it has been desirable to have a consituency of 10% ice crystals and 90% water mixture at the freezer unit. With the 10% ice 90% water mixture a slush concentrator 18 may be used in the discharge line 19 at some remote location. The concentrator 18 may well cause segregation of some of the water in the mixture and the water removed from the mixture may be returned to the slush storage tank 12 by means of the concentrator pump 21 pumping the water through line 22. A final desirable slush ice-water mixture for flow may vary between 20 to 25% ice and 75 to 80% water. In the embodiment illustrated the slush pump 20 at the freezer unit is intended for a 10% ice and 90% water mixture. However, this pump 20 may also utilize the 20 to 25% ice and 75 to 80% water mixtures.

The slush ice mixture will flow under pressure in the line 19 through the flexible hose 24 and will be discharged into a poultry chilling vat 25 for commencement of the poultry chilling cycle. Continuous flow of the slush ice mixture through the line 19 may not be required, particularly when the chilling vats are filled or during non-operating periods. An automatically operated deicing valve 26 which is located in the line 19 and operated by the electric switch 27 at the discharge end of the line may be opened and closed freely despite ice accumulating on the valve seat as will be disclosed more fully hereinafter.

When there is no demand for slush ice at the chilling vats, the valve 26 may be closed and slush ice will flow through branch line 29 through the automatically operated valve 30 in line 31 for discharge into the slush storage tank 12. Valve 20 may be electrically connected to the switch 27 or valve 26 so that upon the closing of valve 26 valve 30 will be opened enabling the slush ice mixture to flow therethrough. Slush ice discharged in the storage tank will accumulate therein to precool make-up water for supply to the freezer unit as disclosed above.

When the slush ice within the storage tank 12 reaches a predetermined level, a conventional electronic level control indicator 33, or comparable level control means, on the storage tank 12, will be actuated. Indicator 33 is electrically connected to storage tank valve 30 and to the solenoid operated valve 34 in line 35. As the slush ice level reaches fixed level in the tank 12 the level control indicator will close valve 30 and open valve 34. Valve 26 may remain closed during this sequence or should there be demand for the slush ice at the chilling vats the switch 27 may be actuated to open valve 26 to admit slush ice to the vats 25.

Assuming valves 26 and 30 are closed, then valve 34 will be opened to admit slush ice to the briquet press 40 which may be remotely located from the freezer unit. The briquets may be formed continuously in any one of the various briquetting machines disclosed in U.S. Patent Nos. 1,937,170, 1,937,174 and 1,982,842, issued to W. H. Taylor. In this briquet machine the slush mixture is continuously fed to the machine by separating the slush ice crystals from excess liquid and finally compressing the separated crystals into a succession of ice briquets. Excess water removed from the slush ice in the briquet making machine 40 will be drained through pipe 41 to flow into the slush storage tank 12.

As the individual briquets are formed they may be discharged from the chute 43 onto the elevating conveyor 44. At the top of the conveyor flight the briquets will be deposited into the briquet storage bin 45 which may be provided with a refrigerated cylindrical shell. On the interior of the bin 45 there is a vertical shaft 46 mounted for rotation by means of a motor drive and transmission 47. A flexible chain 48 fastened at spaced positions along the shaft 46 will rotate with the shaft to dislodge briquets from within the bin for discharge through an opening in the bottom of the bin. Apparatus similar to the unit disclosed in U.S. Patent No. 2,228,421, issued to W. H. Taylor may be employed for briquet storage. An electronic bin level control 49 will indicate when the solid ice storage bin has reached its capacity loading. When this occurs the entire system for producing slush ice may be shut down.

The discharge end 50 in the bin bottom will admit blocks of ice into an automatic crate-icer apparatus 51, to be described in more detail hereinafter. Briefly, the crate-icer apparatus 51, which is electrically actuated by means of a solenoid operated air motor, will receive and dispense a metered quantity of solid ice into a receptacle 52 positioned beneath the flexible cuff 53 at the discharge opening of the crate-icer. Poultry packed within the receptacle 52 will have dispersed therein the solid ice discharged from the crate-icer. The flexible cuff 53 will prevent diversified of the ice as it is discharged from the crate-icer.

A weigh scale 55 interposed before the crate-icer 51 will weigh the poultry packed receptacle 52 just prior to the final ice-packing step. After packing the crate with ice the crate is closed and removed to a refrigerated storage room until shipment to market.

It will be apparent that by means of manually operated valves or controls the slush ice mixture may be diverted to various locations and the slush ice may be rerouted from the briquette press 40 to the slush storage tank 12 by manipulating valves 34 and 30.

As will be readily apparent in the operation of this system, periodically it will be necessary to close or open the valve 26 in the line 19 supplying slush ice to the cooling vat 25. When this valve 26 is closed slush ice will pack or freeze solidly against the valve gate preventing reopening of the valve until the line and valve are thawed sufficiently to permit the free flow of slush ice again. While the line 19 and valve 26 will thaw sufficiently when the surrounding atmosphere is of relatively higher temperature, it will take several hours to do so. Furthermore, the frequency of opening and closing the valve in some processing installations does not permit this prolonged thawing interval, obviously. Although the prior art has taught the application of hot water or steam injection into a line or valve to defrost valves and pipe lines these applications are intended for single use and not for periodic or automatic operation.

The slush ice mixture pumped from the slush pump 20 will flow through the line 19 through the quick closing slush valve 26 when opened, through the concentrator 18 and remaining line 19, and finally the flexible hose 24 will discharge into the chilling vat 25. Valve 26 is a conventional gate valve which may be automatically operated by means of an electric solenoid operated air motor. As will be readily apparent when the demand for the slush mixture ceases and the valve is closed the slush ice will tend to pack solidly against the valve gate and seat thereby preventing the valve from opening freely. Further ice packing will also occur in the line upstream from the valve.

Remote operation of the slush valve may be controlled by an operator at the discharge end of the flexible hose 24 by means of an electric push button switch station 27 which is connected to operate an electric solenoid air motor. A double acting, solenoid controlled air motor similar to those sold commercially by Lehigh, Inc. of Easton, Pennsylvania, has been found suitable in operation. A double acting air motor having air connection and single exhaust port for accommodating the double exhaust has been found suitable for this valve operation. Normally the valve handle 64 may be pivoted between limits to open or to close the valve gate by the introduction of air into the air cylinder 65.

As an example in the application of this method of handling the slush ice mixture the following test was conducted during the experimental period on poultry as the articles to be refrigerated.

For the test 301 chickens were used. Each chicken had the giblets wrapped and stiuffed therein and each chicken weighed 2½ pounds. The chickens were placed in a vat prior to chilling and the temperature of the chickens after 10 minutes averaged 105 degrees F. for the temperature of the breast, and 95 degrees F. for the average temperature of the thigh. A chilling vat 33 in. x 60 in. x 26 in. deep was filled with the 301 chickens and at the same time a slush ice mixture of approximately 25% slush ice and 75% water was being added to the vat. Only three minutes was consumed for the transfer to the vats and to completely ice the vat down. No air agitation or circulation was permitted in this test run.

The following tabulated temperature readings were recorded during the chilling period:

| Elapsed Time, Minutes | Location Chicken in Chill Vat | Temp., °F., Giblets | Temp., °F., Breast | Temp., °F., Thigh | Temp., °F., Water | Water Temp., °F., Location |
|---|---|---|---|---|---|---|
| 5 | Top End | | 73 | 61 | | |
| 7 | Middle Center | | 71 | 59 | | |
| 8 | Top Side | | 65 | 59 | 34 | Top Side. |
| 10 | Bottom Center | | 60 | 44 | 32 | Mid. Center. |
| 16 | Top Side | | 58 | 47 | 35 | Top End. |
| 17 | Middle Center | | 57 | 52 | 38 | Top Side. |
| 20 | Top End | | 52 | 41 | 37 | Top Center. |
| 23 | Middle End | | 55 | 42 | 36 | Mid. Center. |
| 25 | Top Center | 51 | 49 | 38 | | Do. |
| 27 | Middle Center | 50 | 46 | 35 | 36 | Do. |
| | | | | | 40 | Top End. |
| 30 | Bottom End | 54 | 52 | 37 | 36 | Mid. Center. |
| | | | | | 34 | Top End. |
| 35 | Middle Center | 48 | 47 | 44 | | |
| 37 | Bottom End | 49 | 47 | 36 | 34 | Mid. Center. |
| 42 | Middle End | 45 | 43 | 39 | | |
| 45 | Top Center | 45 | 38 | 35 | 40 | Top End. |
| 49 | Top Side | | | | | |
| | Against tank Other | 52 | 49 | 50 | | |
| | Leg Under Water | | | | 36 | |
| 55 | Bottom Center | 42 | 39 | 35 | 37 | Mid. Center. |
| 59 | Top End | 45 | 47 | 37 | | |
| 60 | Middle Center | 44 | 39 | 37 | 36 | Do. |
| 65 | Middle End | 41 | 39 | 38 | 36 | Do. |
| 68 | Top Center | 39 | 38 | 35 | | |
| 70 | Top End | 46 | 43 | 36 | | |
| 75 | Bottom Center | 41 | 40 | 35 | 36 | Do. |
| 80 | Top Side | 44 | 40 | 34 | 36 | Do. |
| 85 | Middle Center | 38 | 37 | 37 | 38 | Do. |
| 90 | Bottom End | 38 | 38 | 36 | | |
| 93 | Middle Side | 44 | 41 | 38 | 38 | Do. |
| 100 | Very little ice left on top | | | | | |
| | Medium amount of ice well distributed throughout birds below top | | | | | |

During normal operation it is intended that 750 pounds of chicken will be placed in a chilling vat with approximately 125 gallons of chilled water and 275 pounds of slush ice to effectuate the chilling operation. In the packing of the poultry it is intended that 65 pounds of poultry will be packed in a crate together with 30 pounds of packing ice.

In the specific application of this system to the mass production of poultry dressing operations there is a rapid and thorough chilling of the poultry with significant saving in time and labor in addition to a more wholesome and sanitary product. Further savings are realized in the cost of solid ice which in this system is always available at the required location.

Many modifications and variations may be made and are contemplated in the construction and arrangement of the equipment as well as the substitution of equivalent apparatus to perform analogous functions to effectuate the method of handling the slush ice mixture and the solid ice without departing from the real spirit of the invention. It is, therefore, to be understood that within the scope of the appended claims many modified forms of structure for the automatic deicing valve and the automatic ice dispenser are intended and equivalents may be reasonably included and modifications are contemplated.

What is claimed is:

1. The process of continuously producing and handling a refrigerant in various states comprising the steps of continuously flowing water over a refrigerated surface, congealing a portion of the water on the refrigerated surface to form a film of ice thereon, removing the frozen film of ice from the refrigerated surface to form discreet ice crystals continuously, mixing the ice crystals removed from the refrigerated surface with water to form a slush ice mixture suitable for flowing in a closed passageway, pumping a portion of said slush ice mixture to a remote location for storage and for refrigerating water for said refrigerated surface, compressing another portion of said slush ice mixture after removing excess water therefrom to form a solid refrigerant, and conveying said solid refrigerant to a storage bin for periodic removal from the storage bin for refrigerating articles.

2. The process of continuously producing and handling refrigerant in various states comprising the steps of continuously flowing precooled water over a refrigerated surface, freezing a portion of the precooled water on the refrigerated surface, removing fine frozen layers of the frozen water from the refrigerated surface forming discreet ice crystals and a slush ice mixture when mixed with the remainder of the water flowing therethrough, pumping portions of said slush ice mixture continuously in closed passageways to remote locations from said refrigerated surface to processing stations, removing a portion of the slush ice mixture for storage, injecting water into the stored slush ice mixture to precool said water for use on said refrigerated surface, dispensing another portion of the slush ice mixture into receptacles for compressing the slush ice mixture to form solid ice blocks, conveying said solid ice blocks to a storage chamber, and periodically removing a quantity of ice blocks from the storage chamber.

3. The art of producing and handling water-ice in various states comprising the steps of precooling water to approximately 32° F., freezing a portion of the precooled water on a refrigerated surface to form a layer of ice thereon continuously, removing the frozen layers of ice from the refrigerated surface for mixing with water to form a slush ice mixture having a consistency suitable for pumping continuously in a closed conduit to remote locations, removing a portion of the water in the mixture to increase the percentage of ice crystals to water, selectively distributing portions of the slush ice mixture to various remote locations, storing a portion of said slush ice mixture for precooling water for use on said refrigerated surface, compressing another portion of the slush ice mixture at another location to form solid ice blocks, and storing said ice blocks for subsequent use as a refrigerant.

References Cited in the file of this patent

UNITED STATES PATENTS

| | | |
|---|---|---|
| 477,758 | Huss | June 28, 1892 |
| 919,917 | McDuffie | Apr. 27, 1909 |
| 1,277,197 | Crandon | Aug. 27, 1918 |
| 1,517,923 | Sylvester | Dec. 2, 1924 |
| 1,982,842 | Taylor | Dec. 4, 1934 |
| 2,059,042 | Schweller | Oct. 27, 1936 |
| 2,259,841 | Speigl | Oct. 21, 1941 |
| 2,263,452 | Birdseye | Nov. 18, 1941 |
| 2,676,471 | Pierce | Apr. 27, 1954 |
| 2,697,646 | Craig | Dec. 21, 1954 |
| 2,699,045 | Bailey | Jan. 11, 1955 |